United States Patent [19]

Jarrett et al.

[11] Patent Number: 5,478,583
[45] Date of Patent: Dec. 26, 1995

[54] PROCESS FOR PRODUCING A COATED FOOD PRODUCT

[75] Inventors: Graham A. Jarrett, Great Yarmouth; Malcolm J. McBride, Northampton; Serge A. Symien, Bedford; Peter Walker; Alan Wooten, both of Northampton, all of Great Britain

[73] Assignee: Unilever Patent Holdings B.V., Vlaardingen, Netherlands

[21] Appl. No.: 276,356

[22] Filed: Jul. 8, 1994

[30] Foreign Application Priority Data

Jul. 8, 1993 [EP] European Pat. Off. ............. 93305364

[51] Int. Cl.$^6$ ................................................... A23L 1/176
[52] U.S. Cl. ........................................... 426/293; 426/291
[58] Field of Search ................................... 426/293, 291

[56] References Cited

U.S. PATENT DOCUMENTS 4,068,009  1/1978  Rispoli et al. ........................ 426/291
4,511,583  4/1985  Olson et al. ........................... 426/89
4,797,292  1/1989  DeWit .................................. 426/285

FOREIGN PATENT DOCUMENTS 0235308  9/1987  European Pat. Off. ......... A23P 1/08
0480433  4/1992  European Pat. Off. ........ A23L 1/325

Primary Examiner—Jeanette Hunter
Assistant Examiner—Choon P. Koh
Attorney, Agent, or Firm—Cushman Darby & Cushman

[57] ABSTRACT

A process for manufacturing a food product having a thick and irregular coating comprising:

(a) coating the food product with a batter; and (b) coating the food product with agglomerated powder; such that the ratio of batter to agglomerated powder is 2.5:1 to 1:1.5.

7 Claims, No Drawings

PROCESS FOR PRODUCING A COATED FOOD PRODUCT

FIELD OF THE INVENTION

The invention relates to a process for manufacturing a food product having a thick and irregular coating.

BACKGROUND AND PRIOR ART

Food products having a thick, irregular coating have been popular with consumers for some time.

Currently such products are provided by a number of processes:

One of these processes comprises initially coating the food product with a thick layer of a viscous batter [having a flow time of >60 seconds through a flow cup number 6 BS3900 A6 (Stanhope Seta)], then applying a thin powder coating before pre-frying, such that the typical ratio of batter to powder is 3:1.

This process has the disadvantage that it is very messy, transfer conveyors and the oil used for pre-frying becoming quickly contaminated with the batter and powder, requiring frequent shut downs for cleaning. Furthermore, this process is difficult to control and results in significant coating weight variations.

Another process comprises initially coating the food product with a thin layer of a conventional batter (having a low viscosity i.e. a flow time of approximately 10 seconds through a flow cup number 6 BS3900 A6) followed by a powder coating application, this process is then repeated one or more times before pre-frying.

This second process minimises the problems of the first, however it is more complex and therefore costly. Furthermore, this process may result in a product having a different coating appearance.

We have now solved the above-mentioned problems of the prior art processes by agglomeration of the powder coating prior to its application to the product.

SUMMARY OF THE INVENTION

Accordingly the invention provides a novel process for coating a food product with a powder to produce a thick irregular coating comprising:

(a) coating the food product with a batter; and (b) coating the food product with agglomerated powder; such that ratio of batter: agglomerated powder is 2.5:1 to 1:1.5.

Furthermore the invention provides a coated food product manufactured according to the defined novel process.

DEFINITION OF THE INVENTION

Preferably the ratio of batter to agglomerated powder is 2:1 to 1:1, most preferably 1:1.

Once the food product has been coated, the coating is preferably pre-set, for example by pre-frying, and the food product is then stored for consumption, typically by freezing.

Suitable food products may be selected from meat, poultry, vegetables and fish.

The powder composition may comprise any suitable ingredient as will be readily determined by the skilled man in the art. For example the powder may comprise flour, such as wheat flour, maize flour and mixtures thereof; starch; spray dried fats, such as spray dried hydrogenated vegetable fats; other fats and/or fat replacers; proteins; flavoring agents, such as salt, sugar, onion powder, garlic powder; spices; rusk; or flavor enhancers.

The batter composition may comprise any suitable ingredient as will be readily determined by the skilled man in the art. For example the batter may comprise flour, such as wheat flour, maize flour and mixtures thereof; starch; spray dried fats, such as spray dried hydrogenated vegetable fats; flavoring agents, such as salt, sugar, onion powder, garlic powder; spices; rusk; raising agents; or processing aids.

Any suitable viscosity of batter may be used providing that the final ratio of batter to powder lies within the defined limits, however, for ease of processing, the batter preferably has a viscosity such that the flow rate through a flow cup number 6 BS3900 A6 is from 10 to 60 seconds.

The food product may optionally be initially predusted prior to the provision of the batter. The pre-dust composition may comprise any suitable ingredient as will be readily determined by the skilled man in the art. For example, the pre-dust may comprise flour, such as rice flour, spray dried fats, such as spray dried hydrogenated vegetable fats; flavoring agents; starch; rusk; or emulsifiers.

The Agglomeration Process

Agglomeration is a well known technique whereby ingredients are bound together under the influence of material bridges or pressure in such a way that a stable granule is formed. There are a number of different suitable agglomeration processes. Two such examples are:

(i) a fluidised bed agglomerator. Water is sprayed onto the fluidised powder within a hot air environment and particles are built up. Once all the water has been sprayed on, the excess moisture is removed by further hot air fluidisation.

(ii) Pressure agglomeration, for example roller compacter (Alexander Machine). The powder is fed between 2 rollers which apply pressure at up to 100 bar. Heat is generated by the mechanical work of the rollers which causes the hydrogenated vegetable fat content of the powder to melt enabling the powder to aggregate.

The agglomerates are then sieved into the desired size fractions.

EXAMPLES

A comparative trial was carried out between a traditional process and the process of the invention using a process line comprising a plate moulder (Formax model 19) to shape meat patties weighing 67 grammes each, a dip enrober (Stein model APB) for batter application, a breader applicator machine (Stein model XLF) and a continuous oil frier heated at 190° C.

Similar ingredients were used in both trials:

| (a) Batter dries formulation: | |
|---|---|
| Wheat flour | 80% |
| Hydrogenated vegetable fat | 4.5% |
| Modified starch | 3% |
| Raising agent | 0.5% |

|  |  |
|---|---|
| Flavours and spices | 12% |
| (b) Powder formulation: | |
| Wheat flour | 60% |
| Spray dried hydrogenated vegetable fat | 20% |
| Rusk | 2% |
| Flavours and spices | 10% |
| Flavour enhancer | 8% |

Conventional Process

In the conventional process, the batter enrober plant was filled with batter made from batter dries (a) mixed with water to give a flow cup viscosity of 75 seconds (Cup No 6, BS 3900 A6, Stanhope Seta).

The breader applicator plant was filled with powder (b).

Meat patties were subjected to the successive steps of (the continuous coating and setting process) in a trial which lasted a total of 100 minutes. Results are described in the following table.

Process of the Invention

In the process of the invention, the batter enrober plant was filled with batter made from batter dries (a) mixed with water to give a flow cup viscosity of 22 seconds (Cup No 6, BS 3900 A6, Stanhope Seta).

The breader applicator plant was filled with powder (b) agglomerated on a roller compactor granulator (Alexanderwerke model WP50/N75) at 75 Bar nip pressure and granulated through a 3 mm mesh screen.

Meat patties were subjected to the successive steps of the (continuous coating and setting process) in a trial which lasted a total of 180 minutes. Results are described in the following table.

|  | Results | |
|---|---|---|
|  | Conventional processing route | Invention process route |
| Meat patty weight | 67 g | 67 g |
| Battered patty weight | 90.5 g | 84 g |
| Fully coated uncooked product weight | 101 g ± 8.75 g SD = 4.9 | 99.75 g ± 2.3 g SD = 1.9 |
| Product surface characteristics | Highly variable appearance | Regularly rugged surface. |
| Processing observations | ranging from smooth to highly rugged. Intensive line soilage. Significant debris build up in frying oil. Process interrupted after 100 min for required cleaning. | Low line soilage. Low debris in frying oil. Process voluntarily interrupted after 180 min. |

Eating characteristics of products made by either route after frying were similar.

It can clearly be seen that the route of the invention offers significant product and processing advantages over the conventional processing route.

We claim:

1. A process for coating a food product with a powder to produce a thick and irregular coating comprising:
   (a) enrobing the food product with a batter; and
   (b) applying to the batter enrobed food product an agglomerated powder; such that the ratio of batter to agglomerated powder is 2.5:1 to 1:1.5.

2. A process according to claim 1 wherein the ratio of batter:agglomerated powder is 2:1 to 1:1.

3. A process according to claim 1 wherein the ratio of batter:agglomerated powder is 1:1.

4. A process according to claim 1 wherein the food product is initially pre-dusted prior to provision of the batter.

5. A process according to claim 1 wherein the food product is selected from the group consisting of fish, vegetable, meat and poultry products.

6. A process according to claim 1 wherein the coated product is pre-set by prefrying and then frozen for storage.

7. A process according to claim 6 wherein the batter is applied to the food product at a viscosity such that the flow rate through a flow cup number 6 BS 3900 A6 is from 10 to 60 seconds, followed by application of the agglomerated powder to the batter-coated food product, the agglomerated powder being prepared by fluidized bed agglomeration or by pressure agglomeration.

* * * * *